(No Model.) 3 Sheets—Sheet 1.

M. E. COOK.
ROAD SCRAPER.

No. 359,848. Patented Mar. 22, 1887.

(No Model.) 3 Sheets—Sheet 2.

M. E. COOK.
ROAD SCRAPER.

No. 359,848. Patented Mar. 22, 1887.

Witnesses.
J. H. Shumway
Fred C. Earle

Marcus E. Cook
Inventor
By atty.
John F. Earle (No Model.) 3 Sheets—Sheet 3.
M. E. COOK.
ROAD SCRAPER.
No. 359,848. Patented Mar. 22, 1887.
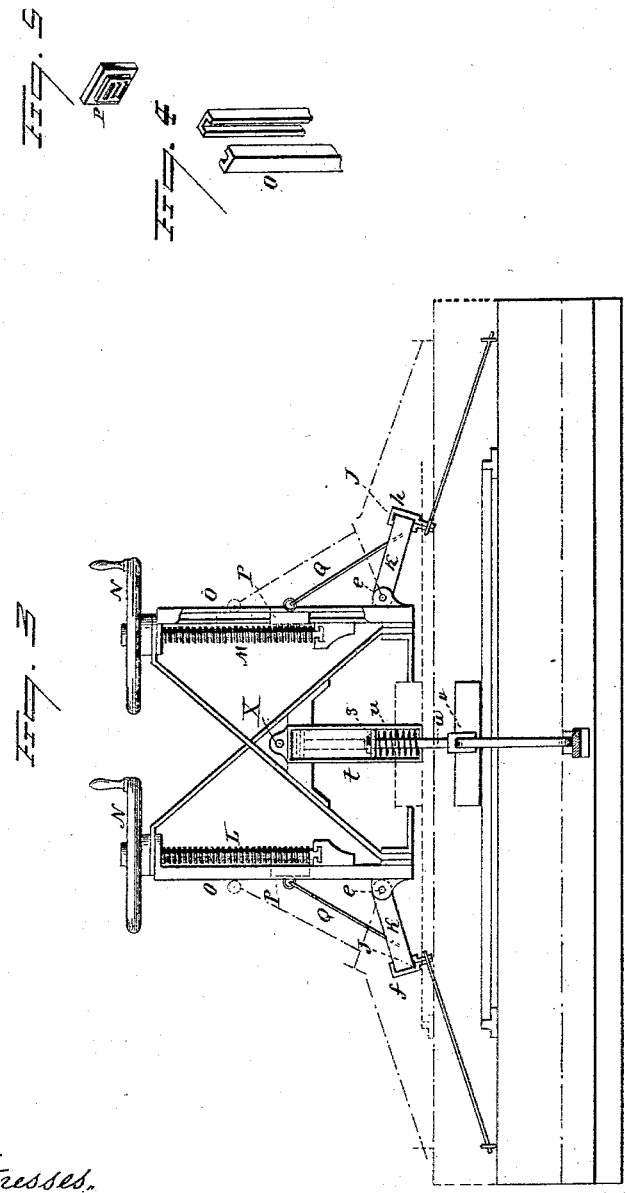

UNITED STATES PATENT OFFICE.

MARCUS E. COOK, OF WALLINGFORD, CONNECTICUT, ASSIGNOR TO THE AMERICAN ROAD MACHINE COMPANY, OF KENNETT SQUARE, PA.

ROAD-SCRAPER.

SPECIFICATION forming part of Letters Patent No. 359,848, dated March 22, 1887.

Application filed May 19, 1886. Serial No. 202,613. (No model.)

*To all whom it may concern:*

Be it known that I, MARCUS E. COOK, of Wallingford, in the county of New Haven and State of Connecticut, have invented a new Improvement in Road-Scrapers; and I do hereby declare the following, when taken in connection with accompanying drawings and the letters of reference marked thereon, to be a full, clear, and exact description of the same, and which said drawings constitute part of this specification, and represent, in—

Figure 1:
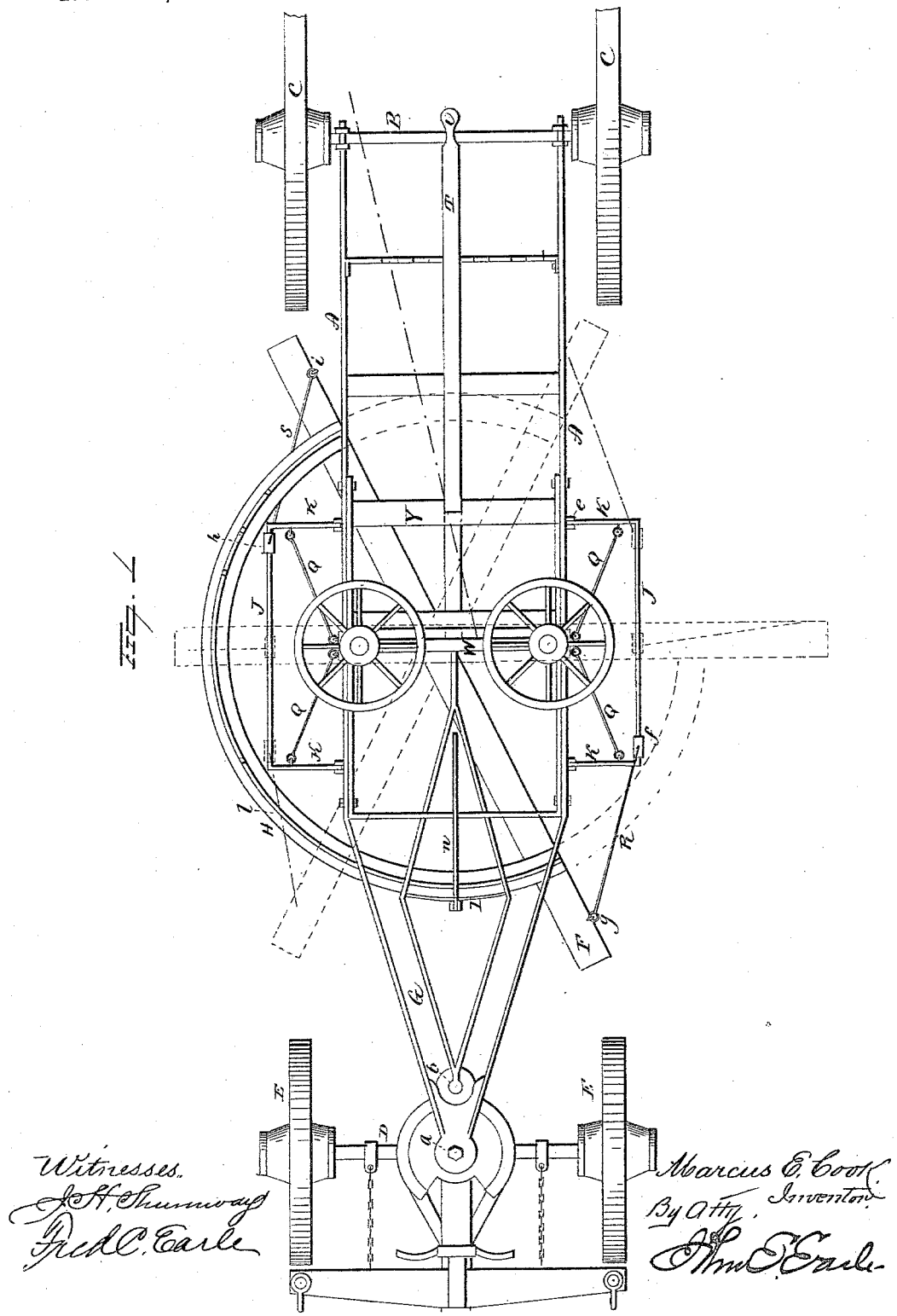
Figure 2:
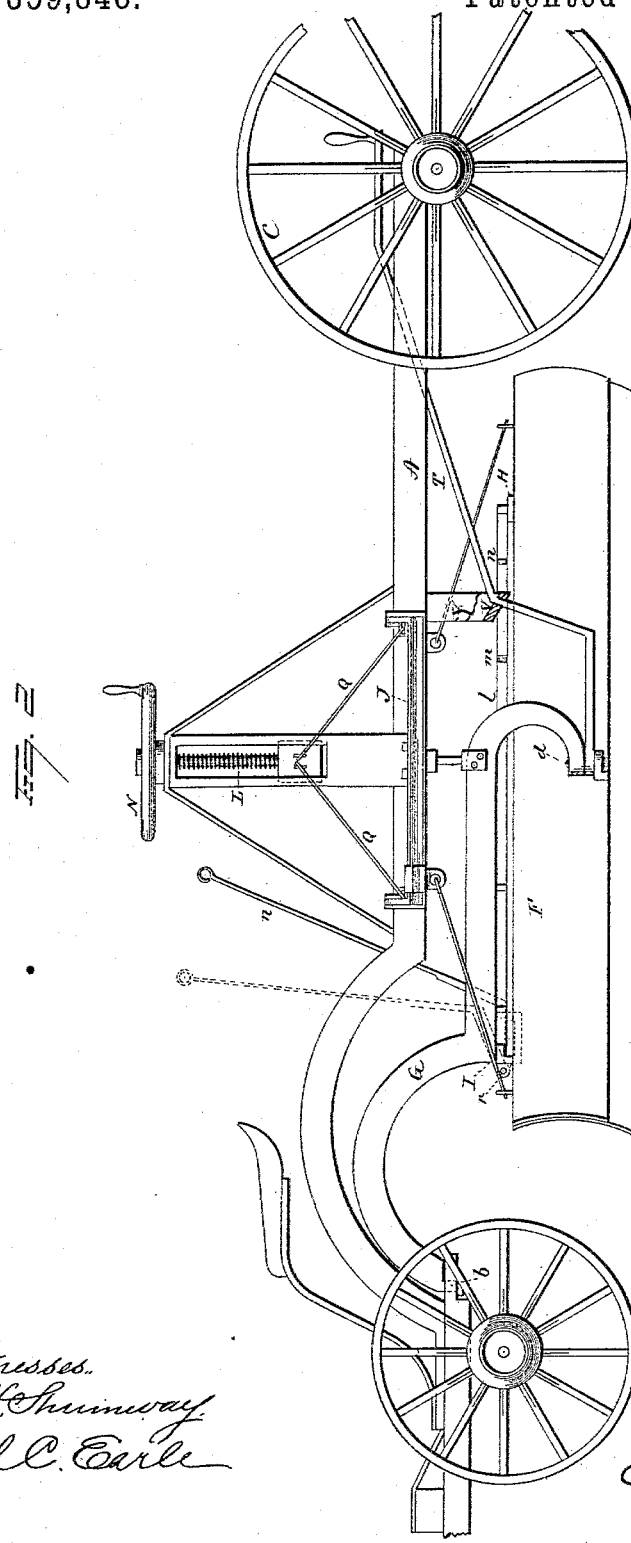

Figure 1, a top or plan view of the machine; Fig. 2, a side view of the same, a portion of the bracket Y broken away to show the opening through which the lever T works; Fig. 3, a transverse section in rear of the scraper and forward of the rear wheels, looking forward, and showing a section through the counterbalancing device; Fig. 4, a perspective view of a portion of the uprights O; Fig. 5, a perspective view of the slide or nut into which the set-screws work.

This invention relates to an improvement in that class of machines employed in leveling and forming the bed of common roads, and which consists in a frame arranged upon wheels adapted to be drawn by animals, and in which a scraper is arranged to work upon the surface of the road under an advance movement, and in which the scraper is made adjustable to different angles and different elevations, the object of the present invention being a simple construction of machine, and one in which the adjustment of the scraper may be made with great facility, and in which the draft upon the scraper may be made in the most direct manner; and it consists in the construction as hereinafter described, and more particularly recited in the claims.

The frame, which is made, preferably, from iron, consists of two sides, A A, supported at the rear upon an axle, B, between two wheels, C C, on the said axle. The frame extends forward, and is contracted to a king-bolt, a, on a forward axle, D, which carries the two forward wheels, E E, and to which axle the animals are attached in the usual manner for the propulsion of the apparatus.

F is the scraper, which is of the requisite length in proportion to the machine, and, as in the usual construction, it is arranged between the rear and forward wheels, and so as to be adjusted to different angles therein with relation to the path of the wheels, such adjustability being indicated in Fig. 1. In order to apply the draft directly to the scraper, and thereby greatly relieve the frame from the strain of such draft, I apply what I call a "goose-neck," G, its forward end hung, preferably, to the frame just in rear of the king-bolt, and as at b. It is made of iron, and extends rearward beneath the frame, and at its rear end turns downward and forward, and is connected to the scraper by a pivot, as seen at d, Fig. 4. This pivotal connection permits the scraper to be turned to its various angular positions, but brings the draft of the gooseneck directly upon the scraper, and so that the scraper is propelled by the goose-neck thus engaged with it.

Attached to the scraper, and extending forward from its upper edge, is a segement, H, concentric with the pivot d, upon which the scraper turns. This segment works through a guide or support, I, attached to or made a part of the goose-neck, and so that as the scraper is rotated upon its center the segment works through the said support as a guide.

Upon each side of the frame and parallel therewith, is a guide-bar, J, and from which arms K extend inward toward the frame, and hinged thereto, as at e, (see Fig. 3,) and so that the said guide-bar may be adjusted up and down to different elevations, and to thus adjust the guide-bars, a vertical leading-screw, L, is arranged upon one side, and a like screw, M, upon the opposite side, these screws being arranged for free rotation under the action of hand-wheels N, or their equivalents. These screws are supported in uprights O, and in each upright is a sliding nut, P, from which links Q extend, respectively, to the arms K or guide-bars, and so that as the screws L M are rotated in one direction, either or both, the guide-bar in connection with the screw so turned will be raised or lowered, according to the direction in which the screw is turned, as indicated in broken lines Fig. 3. On the guide-bar on one side is a slide, f, to which a link, R, is attached by one end, the other end of the link hung to the scraper near one end, as at g, and on the other guide-bar J is a like slide, $h$, to which one end of a link, S, is hung, the other end of the link hung at the opposite end of the scraper, as at $i$, Fig. 1. The arrangement of the slides $f\ h$ and their respective links with relation to the scraper are such, as seen in Fig. 1, that as the scraper stands at one extreme one slide, $h$, will stand at its extreme point on its bar J, and the other slide, $f$, will stand at the opposite extreme of its bar J, and so that as the scraper is rotated, turning upon its center, the respective slides $f\ h$ will move along the respective bars, the links turning in their connections between the slides and the scraper, so that as the scraper is turned from one extreme, as seen in Fig. 1, to the opposite extreme, the relative position of the slides and links will be reversed, as indicated in broken lines, Fig. 1. This enables the scraper to be turned from an extreme angle in one direction to the path of the advancing machine to the opposite extreme, and of course is adapted to rest at any intermediate point.

By the connection of the links with the guide-bars J, if the guide-bars be raised or lowered, the scraper will be raised or lowered accordingly; hence the elevation of the scraper may be adjusted by turning the respective screws L M. If one end is to be raised independent of the other, then the screw toward that end of the scraper will be turned accordingly, and vice versa. The frame-work may be provided with a flooring upon which the operator may stand to work the screws to adjust the elevation of the scraper.

The scraper is often employed to dig into a bank at one side or the other, as a plow, to cut down the bank. To do this, it is often desirable to make the scraper extend to a greater extent in the direction of the bank than the position which it naturally attains when in its central or normal position. To do this, a lever, T, is arranged, which extends to the rear, terminating in any suitable handle. This lever extends forward through a fulcrum, V. This fulcrum is a transverse bar hung to the frame by brackets Y, the bar standing in an oblique plane. Centrally through the bar is an opening and through which the lever extends, as seen in Figs. 1 and 2. The lever is bent downward, so as to extend through the opening in the bar, and that bend permits the lever to work up and down, as occasion may require, yet retain its position upon the fulcrum. The forward end of the lever is hung, preferably, to the same pivot as that to which the goose-neck is hung, and as seen in Fig. 2, and so that the workman taking hold of the lever at the rear may swing the lever to one side or the other, according to the position of the bank to be worked upon, and the lever working through the fulcrum V the forward arm will force the scraper to the right or left, as the case may be, and as indicated in broken lines, Fig. 1, where the scraper is represented as thrown to the left.

The lever may be secured at any desired position to which it may be set so as to hold the scraper accordingly—say as by notches formed in a cross-bar on the frame, as seen in Fig. 1. The link-connection by which the scraper is hung permits this sidewise movement of the scraper, and the lever serves to hold the scraper in any position to which it may be set.

It is desirable to lock the scraper when the desired position is attained. To this end a rib, $l$, is formed on the upper surface of the segment, and in this rib notches $m$ are made, more or less in number, and on the support I a lever, $n$, is hung, as upon a fulcrum, $r$, the lever extending rearward from the fulcrum, so as to fall into either of the notches in the rib $l$, presented thereto, and so that the operator may raise the lever, as indicated in broken lines, Fig. 2, and disengage the locking-lever from the scraper, leaving the scraper free to be readjusted, and when the proper position is reached the lever will drop into another notch and lock the scraper in that position. By this construction the draft upon the scraper is taken substantially direct from the forward axle, and without material strain upon the frame in rear of that point of connection. The invention also enables the construction of the machine from iron and of the strongest possible character.

The adjustment of the scraper is universal, simple, and readily made while the scraper is in operation.

As a counter-balance for the scraper, and whereby it may be the more readily adjusted, I arrange a vertical cylinder, $t$, concentrically over the pivot between the goose-neck and the scraper. This cylinder is hung upon a pivot, X, (see Fig. 3,) at its upper end, so so that it may swing to the right or left, and in this cylinder I place a spring, $u$, preferably a helical spring, and through this spring is a rod, $w$, having a head, 3, at its upper end, bearing upon said spring, the lower end of the rod hung to the goose-neck, as at 4, (see Fig. 3,) and so that the scraper hangs upon the said spring and by its weight will compress the spring, and to the extent that the spring is compressed to that extent the scraper is counterbalanced, and because of such counterbalancing-spring the elevation of the scraper is made more easily than it could be without such counter-balance. A pivot at its upper end permits it to swing to the right or left to allow the before-mentioned right or left movement of the scraper for digging into the bank.

I claim—

1. In a road-scraper, the combination of a frame supported upon wheels at the rear and wheels at the front, a scraper intermediate between said wheels and made adjustable to different angles with relation to the path of said wheels, the goose-neck G, hung near the forward axle and extending rearward, hung directly to the scraper independent of the frame, substantially as described.

2. The combination of the frame supported upon wheels at the front and rear, the scraper F between said wheels, the goose-neck G, hung by its forward end to a point near the forward axle and extending rearward, its rear end hung to the scraper independent of the frame, the said scraper provided with a fixed segment, H, and the goose-neck with a corresponding support, I, through which the said segment works, substantially as described.

3. The combination of the frame supported upon wheels at the front and rear, a scraper, F, arranged between said wheels, goose-neck G, hung by its forward end near the forward axle and extending rearward, its rear end hung directly to the scraper independent of the frame, the said scraper provided with a fixed segment, H, and the goose-neck with the support I, through which the said segment works, the locking-lever n, hung to said goose-neck, and the segment provided with notches with which the said locking-lever may engage at different positions, substantially as described.

4. The combination of a frame hung upon wheels at the front and rear, the scraper F between said wheels, the guide-bars J, one hung at each side of the frame and adapted to swing vertically and slide on each of said guide-bars, and a link connecting said slides with the respective ends of the scraper, and mechanism, substantially such as described, to vertically adjust said guide-bars, substantially as set forth.

5. The combination of a frame hung upon wheels at the front and rear, the scraper F between said wheels, the guide-bars J, hung one upon each side of the frame and substantially parallel therewith, a slide upon each of said guide-bars, and a link connecting the said slides respectively with the end of the scraper, vertical leading-screws L M, and a connection between the said screws and the respective guide-bars, substantially as described, and whereby said guide-bars with the scraper are made vertically adjustable.

6. The combination of a frame hung upon wheels at the front and rear, a scraper, F, between said wheels and below the frame, the goose-neck G, its forward end hung near the forward axle and extending rearward, its rear end hung to the scraper independent of the frame, guide-bars J, hung one upon each side of the frame and substantially parallel therewith, the slide on each of said guide-bars, and a link connecting each of said slides with the respective ends of the scraper, the said guide-bars made vertically adjustable, substantially as described.

7. The combination of a frame hung upon wheels at the front and rear, the scraper F, arranged between said wheels and below said frame, the goose-neck G, hung by its forward end near the forward axle and extending rearward, its rear end hung to the scraper independent of the frame, the lever T, arranged through a fulcrum, Y, in rear of the scraper, the forward end of said lever hung to the scraper, the other end extending rearward to form a handle by which the said scraper may be adjusted, substantially as described.

8. In a road-scraper supported upon wheels and in which the scraper is made adjustable vertically, the combination therewith of a cylinder hung in the frame above the scraper and so as to swing laterally, a counterbalancing-spring in said cylinder, and a connection therefrom to the scraper, substantially as described, and whereby the said spring to the extent of its power counterbalances the scraper, substantially as described.

9. The combination of a frame supported upon wheels, a scraper, F, made adjustable vertically with relation to said frame, a goose-neck hung by its forward end and extending rearward, its rear end hung to the scraper independent of the frame, and a counterbalancing-spring on the frame-work above said scraper, and substantially concentric with the pivot between the scraper and goose-neck, substantially as and for the purpose described.

MARCUS E. COOK.

Witnesses:
JOHN E. EARLE,
FRED C. EARLE.